UNITED STATES PATENT OFFICE.

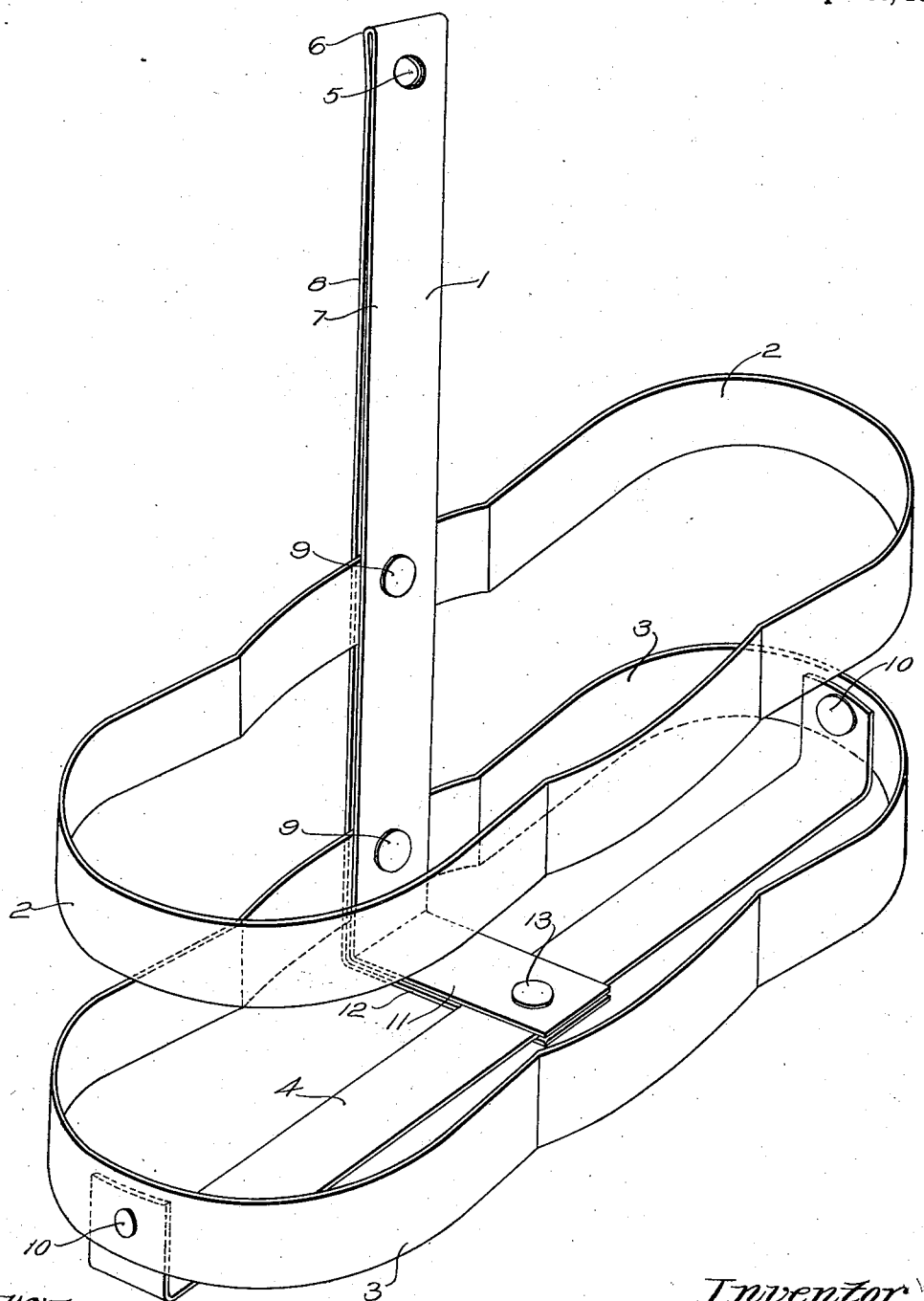

HERBERT A. STEVENS, OF MALDEN, MASSACHUSETTS.

BATTERY-HOLDER.

1,023,178.  Specification of Letters Patent.  Patented Apr. 16, 1912.

Application filed April 5, 1911. Serial No. 619,007.

*To all whom it may concern:*

Be it known that I, HERBERT A. STEVENS, a citizen of the United States, residing at Malden, in the county of Middlesex and State of Massachusetts, have invented certain new and useful Improvements in Battery-Holders; and I do hereby declare the following to be a full, clear, and exact description of the invention, such as will enable others skilled in the art to which it appertains to make and use the same.

The present invention relates to battery holders and more particularly to battery holders which are adapted to support one or more battery cells and to be hung from a nail, hook or similar support.

In house wiring for electric bells or annunciators, in installing ignition or lighting systems on automobiles or motor boats or in similar circumstances calling for the use of electric batteries, and particularly dry batteries, it is desirable that some means such as a battery holder be provided to support the battery cells at the place where they are most convenient for the wiring system. To constitute a commercial success the battery holder must be cheap to manufacture, must be light, portable and easily carried in the kit of the workman, must be easily hung in place, and must hold the battery cells securely, yet at the same time allow the cells to be easily removed to be replaced by new cells.

The object of the present invention is to produce a battery holder which is light and durable, which is complete in itself, which can be installed with a minimum of work and time, which securely yet removably supports the cells, and which can be manufactured at the cost of but a few cents.

With the above object in view the present invention comprises the battery holder hereinafter described and particularly pointed out in the claims.

On account of its cheapness, the readiness with which it is bent and secured in place, and the neat and pleasing appearance given thereby to the completed battery holder, ordinary strap iron is preferably, but is not necessarily, employed in constructing the battery holder. The ease with which strap iron may be bent would ordinarily preclude its use in building a battery holder which is durable and capable of supporting an electric battery, but by the peculiar construction which is hereinafter disclosed, and which constitutes a feature of the present invention, it is possible to use a very light weight and cheap grade of strap iron and at the same time to produce a battery holder which possesses in the parts subject to bending strain, all the stiffness requisite to support the heaviest type of battery in commercial use.

Referring to the drawings which illustrate a holder capable of receiving three cells and constituting one form of the preferred embodiment of the present invention, the battery holder comprises a vertical hanger or back piece 1, belts or bands 2 and 3 which are adapted to surround and embrace the sides of the batteries, and a horizontal supporting strap or cross piece 4 which extends across the bottom of the belt 3 and is adapted to support the bottoms of the battery cells. The hanger or back piece 1 is provided at its upper end with a hole 5 by means of which the battery holder is adapted to be hung on a nail or hook driven in a wall or post, or on any similar support. The hanger 1 forms the "back bone" of the holder and is so formed that it possesses the stiffness requisite both to rigidly support the other members and to resist being itself buckled outward by the weight of the cells. The hanger or back piece 1 preferably consists of a single piece of strap iron doubled over at the top 6 to form two parallel separated depending front and back portions or strips 7 and 8.

In assembling the hanger, the belts 2 and 3 are bent in shape to conform to the outline of the number and kind of batteries the hanger is designed to receive, and the ends of the belts are brought together and secured to the hanger 1 by rivets 9 which pass through the front portion 7, through the ends of the belts 2 and 3 and through the back portion 8 of the hanger. The parallel portions 7 and 8 of the hanger or back piece are thus secured to opposite faces of the iron strips which form the belts or bands 2 and 3 and are separated by the thickness of the ends of the belts. The portions 6 and 7 are held from movement relatively to each other by the connecting doubled-over portion 6 at the top and by the rivets 8, so that a very stiff back piece is provided which cannot buckle or bend and which rigidly and securely holds the ends of the belts 2 and 3. The two separate parallel rivet-connected strips 7 and 8 form a reinforced back piece which is stiff enough to support the heaviest batteries without bending, even though a very light and cheap grade of strap iron is used in making the holder. Moreover, by concealing the ends of the belts 2 and 3 between the two strips 7 and 8 the neat and attractive appearance of the holder is enhanced.

The ends of the cross piece 4 are bent up and secured to the belt 3 by rivets 10, the cross piece, as illustrated, preferably depending a little from the belt 3. In a battery holder which is designed to hold a plurality of batteries and in which the cross piece 4 is comparatively long, or in a battery holder designed to hold a particularly heavy type of battery, it is advisable to support the cross piece 4 at the middle as well as at the ends, partly to prevent the cross piece from sagging and partly to relieve the belt 3 from supporting the entire weight of the battery or batteries. With this end in view the lower end of the hanger is bent to extend horizontally forward, the horizontal continuations 11 and 12 of the two strips 7 and 8 being secured on either side of the cross piece 4 by the rivet 13. This support for the middle of the cross piece 4 adds considerably to the stiffness of the hanger, but when this added stiffness is unnecessary, as for example in a hanger designed to support only one or two light weight batteries, the back piece need not extend down beyond the point at which the belt 3 is riveted to it.

The cross piece 4 firmly supports the batteries from beneath and the belts or bands 2 and 3 removably yet securely hold the batteries in place so that the hanger is particularly adapted to be used where the batteries must be securely held, as for example in holding dry batteries used on ship board or for the ignition or lighting systems of automobiles or motor boats. As delivered to the workman, each battery holder is complete in itself, and at most requires but a hammer and a nail to secure it in place.

It is evident that the battery holder may be made any size to hold different numbers of cells and cells of different sizes and shapes and that material other than strap iron can be used in its construction.

The present invention is not limited to its preferred embodiment as illustrated in the drawings and specifically as described in the foregoing specification but may be embodied in other forms within the scope of the following claims:

1. A battery holder, having, in combination, belts or bands adapted to surround and embrace the sides of a battery cell, a cross piece secured at its ends to the lowermost belt or band and adapted to support the bottom of the battery cell, and a hanger or back piece by which the battery holder is adapted to be hung from a support, said hanger or back piece comprising two separated parallel portions secured to opposite faces of the belts or bands and acting to support said belts or bands substantially as described.

2. A battery holder, having, in combination, belts or bands adapted to surround and embrace the sides of a battery cell, a cross piece secured at its ends to the lowermost belt or band and adapted to support the bottom of the battery cell, and a hanger or back piece by which the battery holder is adapted to be hung from a support, said hanger or back piece being secured to and acting to support the belts or bands and having its lower end turned forwardly to support the middle of the cross piece, substantially as described.

3. A battery holder, having, in combination, belts or bands adapted to surround and embrace the sides of a battery cell, a cross piece secured at its ends to the lowermost belt or band and adapted to support the bottom of the battery cell, and a hanger or back piece by which the battery holder is adapted to be hung, said hanger comprising a piece of metal bent over at the top to form two separated parallel depending portions between which the ends of the belts or bands are secured and the lower ends of which are bent forwardly and secured to the middle of the cross piece, substantially as described.

4. A battery holder, having, in combination, belts or bands of strap iron bent to conform to and adapted to surround and embrace the sides of a battery cell, a strap iron cross piece having upturned ends secured to the lowermost belt or band, and a hanger or back piece consisting of a single piece of strap iron doubled over at the top to form two separated parallel depending strips, the ends of the belts or bands being secured between and acting to separate the two strips of the back piece, and the lower end of the back piece being turned horizontally forward and secured to the middle of the cross piece, substantially as described.

HERBERT A. STEVENS.

Witnesses:
  ALICE ACKROYD,
  GEORGE E. STEBBINS.

Copies of this patent may be obtained for five cents each, by addressing the "Commissioner of Patents, Washington, D. C."